(12) United States Patent
Hsu et al.

(10) Patent No.: US 8,701,103 B1
(45) Date of Patent: Apr. 15, 2014

(54) METHOD AND SYSTEM FOR MINIMIZING OR ELIMINATING DOWNTIME WHEN UPDATING A WEBSITE

(75) Inventors: Jack P. Hsu, Palo Alto, CA (US); Sonali Deshmukh, Foster City, CA (US); Izrail Blank, San Francisco, CA (US); Ilya Milman, San Francisco, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 1549 days.

(21) Appl. No.: 11/932,226

(22) Filed: Oct. 31, 2007

(51) Int. Cl.
*G06F 9/44* (2006.01)

(52) U.S. Cl.
USPC .......................................... 717/171; 717/168

(58) Field of Classification Search
USPC ........... 717/168–178; 709/217–219, 238–244
See application file for complete search history.

(56) References Cited

U.S. PATENT DOCUMENTS

| | | | | |
|---|---|---|---|---|
| 5,873,088 | A * | 2/1999 | Hayashi et al. | 1/1 |
| 6,360,363 | B1 * | 3/2002 | Moser et al. | 717/170 |
| 6,397,385 | B1 * | 5/2002 | Kravitz | 717/173 |
| 6,966,058 | B2 * | 11/2005 | Earl et al. | 717/171 |
| 6,981,056 | B1 * | 12/2005 | Aviani et al. | 709/239 |
| 7,000,229 | B2 * | 2/2006 | Gere | 717/169 |
| 7,072,979 | B1 * | 7/2006 | Aviani et al. | 709/239 |
| 7,155,462 | B1 * | 12/2006 | Singh et al. | 717/170 |
| 7,233,981 | B2 * | 6/2007 | Tenereillo et al. | 709/219 |
| 7,475,157 | B1 * | 1/2009 | Tormasov | 709/238 |
| 7,555,751 | B1 * | 6/2009 | Abbavaram et al. | 717/168 |
| 7,634,549 | B1 * | 12/2009 | Ghaisas et al. | 709/220 |
| 7,668,870 | B1 * | 2/2010 | Sykes et al. | 707/999.2 |
| 7,757,226 | B2 * | 7/2010 | Srivastava et al. | 717/170 |
| 2002/0032727 | A1 * | 3/2002 | Dias et al. | 709/203 |
| 2003/0233648 | A1 * | 12/2003 | Earl et al. | 717/176 |
| 2004/0216084 | A1 * | 10/2004 | Brown et al. | 717/102 |
| 2005/0210461 | A1 * | 9/2005 | Srivastava et al. | 717/170 |
| 2010/0114823 | A1 * | 5/2010 | Sykes et al. | 707/626 |

OTHER PUBLICATIONS

Michele Cyran, Oracle9i Database Concepts, Release 2 (9.2), pp. 10-27 to 10-28, Mar. 2002.

* cited by examiner

*Primary Examiner* — Qing Chen
(74) *Attorney, Agent, or Firm* — David R. Stevens; Stevens Law Group

(57) ABSTRACT

Websites, including supporting databases, are updated with little or no downtime. In one aspect, a database is replicated prior to updating, so that updates can be performed on one copy while the other remains operational. In another aspect, the data remains in one location while an application programming interface for interacting with the data using new software code is introduced. Another application programming interface remains operational while the update is taking place. Public and private synonyms are used to direct web traffic to the appropriate application programming interface during the update process.

23 Claims, 16 Drawing Sheets

METHOD AND SYSTEM FOR MINIMIZING OR ELIMINATING DOWNTIME WHEN UPDATING A WEBSITE

FIELD OF THE INVENTION

This invention relates generally to website administration, and more particularly to techniques for minimizing or eliminating downtime when updating a website.

BACKGROUND OF THE INVENTION

One aspect of the World Wide Web that has contributed to its vast popularity is the fact that users can access most websites at any time of the day or night. This feature allows users to obtain information, do their shopping or banking, plan trips, and perform many other web-enabled transactions and operations at whatever time suits the users' wishes or needs. In fact, users have developed an expectation that websites should be available twenty-four hours a day, seven days a week. Websites that fail to meet these expectations can cause inconvenience to users, have a negative impact on the user's perception of the underlying company, and can cause companies to lose business.

It is often needed or desirable to update a website so as to incorporate new functionality and/or information. Such updates may include, for example, database updates, application server updates, security updates, user interface upgrades, and the like. For example, for an e-commerce website, updates may be needed to add, delete, or change products, change descriptions, change the operation of the shopping cart and other features, and the like. Database schema updates may also be needed, for example if fields are to be added, deleted or changed within a database table.

Website updates often involve a substantial amount of effort and can take time. Conventionally, therefore, it is often necessary to take down a website while updates or other maintenance is taking place. Generally, website operators try to perform such operations at a time when traffic is at a minimum, for example during the very early mornings within the geographic region having the greatest concentration of website visitors (or potential visitors). However, for websites that are commonly accessed by people around the world, it may be difficult to identify such low-traffic time periods. In addition, even if updates are performed during low-traffic time periods, some users will still be inconvenienced by the lack of availability of the website during these time periods.

Furthermore, any users who are in the midst of an online session, such as for example making a purchase on an e-commerce site, will be particularly disrupted when the website is taken down. In some cases, valuable session data may be lost and the user may have to re-enter the data at such time as the website is made available again. In other cases, the user may be unsure as to whether the transaction was completed. Users experiencing such frustrations may be compelled to conduct their business at a competitor's site, thus costing the website operator some valuable business.

What is needed, therefore, is a system and method of updating a website with little or no downtime. What is further needed is a system and method for updating a database schema for a website with little or no downtime. What is further needed is a system and method of performing website updates in a manner that avoids the limitations and disadvantages of conventional techniques.

SUMMARY OF THE INVENTION

Embodiments are described for performing updates to websites, including supporting databases, with little or no downtime. In one embodiment, a database is replicated prior to updating, so that updates can be performed on one copy while the other remains operational. Once the update is complete, the updated copy goes live. Any data changes that took place during the update (because of user transactions that occurred during the update) are copied over to the newly live copy.

A second embodiment avoids the need to replicate the database prior to updating it. Instead, the data remains in one location while an application programming interface for interacting with the data using new software code is introduced. Another application programming interface remains operational while the update is taking place. Once the software code update is complete, the updated application programming interface goes live. Here, data changes that took place during the update (because of user transactions that occurred during the update) do not have to be copied over, because the same instance of the data remains live throughout the update process. Backward compatibility can be enforced, so as to ensure that despite any changes to the database schema, the database will still be usable by the previous version of the software code.

One skilled in the art will recognize that the above listed features and advantages can be provided singly or in any combination.

DETAILED DESCRIPTION OF THE EMBODIMENTS

For illustrative purposes, the invention is described in terms of a system and method for updating a back-end database for a website, such as in the context of a release of a new version of the website. One skilled in the art will recognize, however, that the present invention can be used as an improved methodology for performing any type of software update in a variety of contexts.

Data and Code Replication

Figure 1:
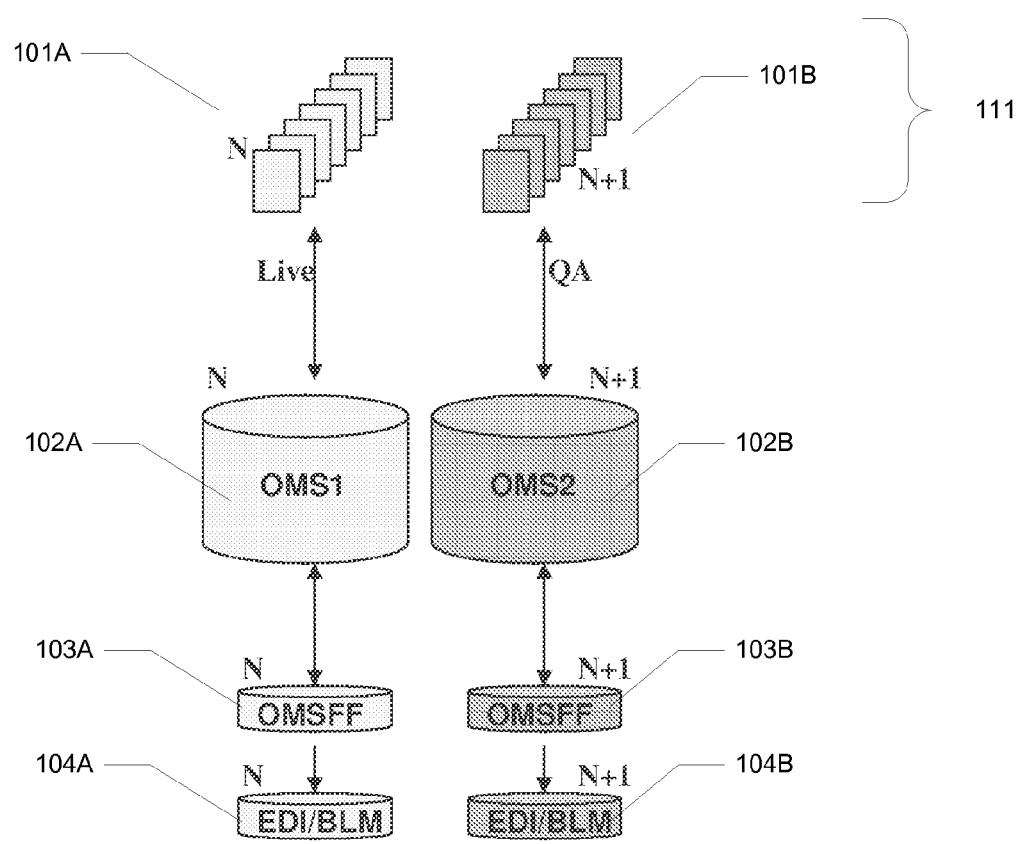
FIG. 1 is a block diagram depicting an example of a technique for updating a website database according to one embodiment, where data and code replication are performed prior to the database update.
Figure 2:
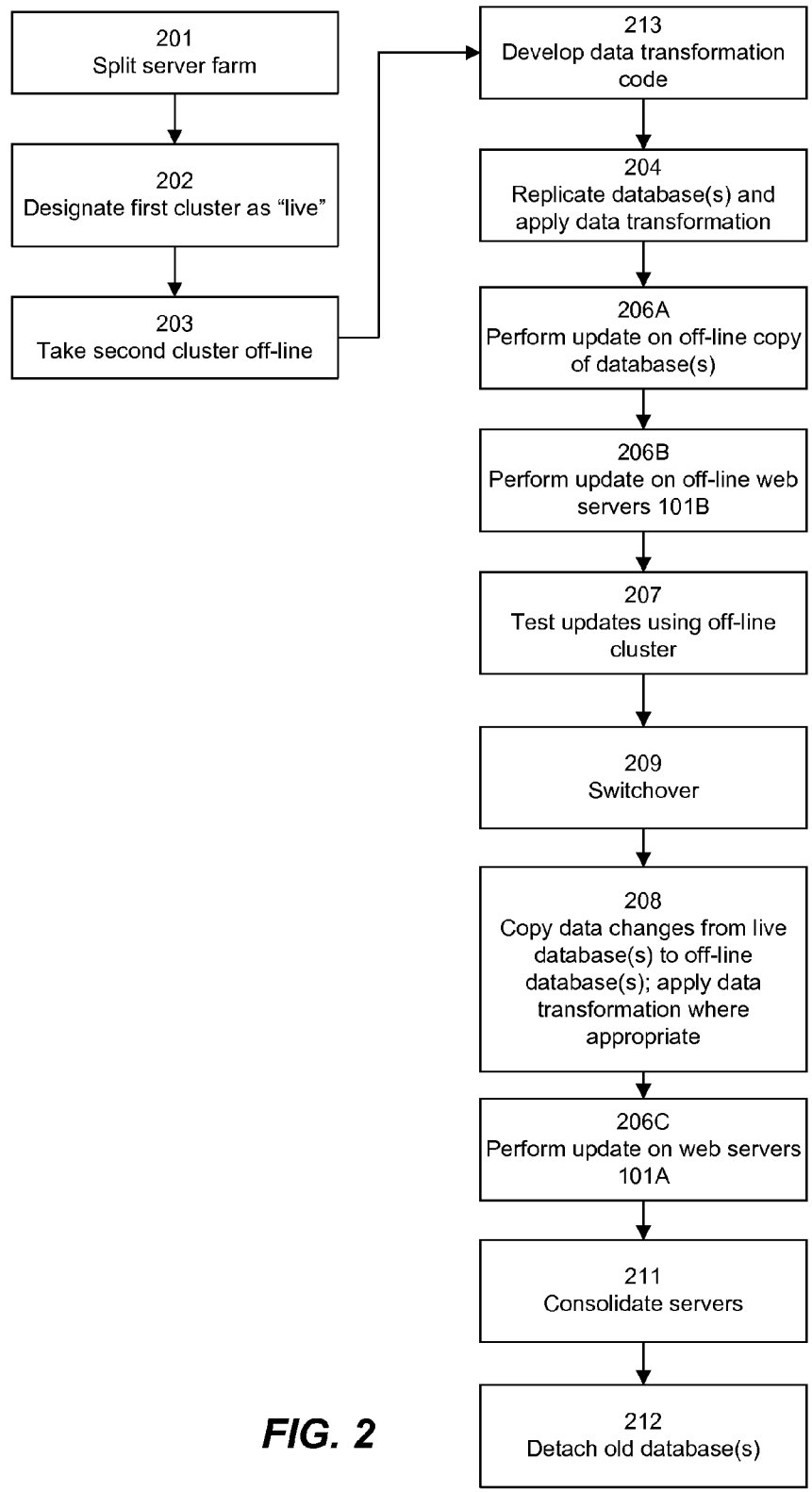
FIG. 2 is a flow diagram depicting an overall method for updating a website database according to the data and code replication method.

Referring now to FIG. 1, there is shown a block diagram depicting an example of a technique for updating a website database according to one embodiment, where data and code replication are performed prior to the database update. Referring also to FIG. 2, there is shown a flow diagram depicting an overall method for updating a website database in this manner. As is typical for large-scale website operations, such as e-commerce sites, a large number of servers are available. For example, many e-commerce sites have 100 servers or more, along with underlying databases such as an order management system database, electronic data interchange database, and the like. When an update is to be performed, the server farm 111 is split 201 into two clusters 101A, 101B. A first cluster 101A is designated 202 as "live", while a second cluster 101B is taken off-line 203 for testing purposes. In one embodiment, the present invention takes clusters off-line by causing a website traffic director such as a network load balancer (not shown) to direct all traffic to those clusters designated as "live".

If any table structures are to be changed as part of the update (for example, if a data field is to be split into two new fields), data transformation code is developed 213 to facilitate moving data into the new format. The data transformation code is usually release-specific software and appropriate to the type of table structure change that is being implemented.

Database(s) is/are replicated 204, with each copy of the database 102A, 102B being associated with one of the clusters 101A, 101B, respectively. Thus, the databases 102A, 102B contain the same software code, database schemas, and data. Thus, all web traffic will be directed to the live cluster 101A and processed by database 102A for the duration of the update. In the replication process 204, any needed data transformations as developed in 213 are applied.

For illustrative purposes, FIG. 1 depicts an order management system database 102A that is replicated as 102B, as well as two additional databases (order management system fulfillment (OMSFF) database 103A and electronic data interchange/logging management (EDI/BLM) database 104A) that are replicated as 103B, 104B. One skilled in the art will recognize that, in connection with the present invention, any number and type of such databases can be similarly handled. In one embodiment, OMS database 102A, 102B posts orders to OMSFF database 103A, 103B; EDI/BLM database 104A, 104B then retrieves orders from OMSFF database 103A, 103B to proceed.

Database and/or software code updates (such as API updates, for example) are performed 206A on the off-line database(s) 102B, 103B, 104B, and server updates are performed 206B on the off-line web servers 101B. Such updates can include changing database schemas, software code logic, field definitions, settings and preferences, and the like. Any required testing 207 is performed using cluster 101B.

Once database(s) 102B, 103B, 104B has been updated and once all data changes from database(s) 102A, 103A, 104A have been copied over to database 102B, a switchover 209 takes place: Cluster 101B and database(s) 102B, 103B, 104B are designated as "live" and cluster 101A and database(s) 102A, 103A, 104A are taken off-line.

While the database(s) 102B, 103B, 104B are being updated using off-line cluster 101B, the live cluster 101A continues to handle all web traffic, directing the traffic to database(s) 102A, 103A, 104A for processing. User interaction with the website may cause some of the data in database(s) 102A, 103A, 104A to change during the update of database(s) 102B, 103B, 104B. For example, in an embodiment where the website is an e-commerce site, any user order received during the update will be reflected in the data in database(s) 102A, 103A, 104A but will not be reflected in the data in database(s) 102B, 103B, 104B, since that copy of the data is offline at the time of the user order. Accordingly, any data changes that have occurred in database(s) 102A, 103A, 104A since database(s) 102B, 103B, 104B was taken off-line are copied 208 to database(s) 102B, 103B, 104B. In order to facilitate this, such data changes that take place during the update are tracked so that they can be copied over. If a table structure has changed as part of the update (for example, if a data field is split into two new fields), the data transformation developed in 213 is performed on the data being copied over so as to match the new table structure.

In one embodiment, data changes are tracked by logging a timestamp when the data replication 204 has completed, and then running a query on the data in database(s) 102A, 103A, 104A to identify changes that have taken place after the timestamp. In one embodiment, this copying 208 is performed periodically during the update 206, so as to avoid the need to do a large amount of copying at the end of the update 206.

In an alternative embodiment, data changes are copied 208 before switchover 209.

In one embodiment, sequence numbers are selected so as to avoid any conflict when data is copied over. For example, databases 102A, 103A, 104A may use odd sequence numbers while databases 102B, 103B, 104B use even sequence numbers. In this manner, no sequence number conflict occurs when data is copied from databases 102A, 103A, 104A to databases 102B, 103B, 104B.

If needed, server updates are performed 206C on the off-line web servers 101A.

Servers in cluster 101A are then consolidated 211 with those of cluster 101B so that the entire server farm is again available to receive web traffic. Database(s) 102A, 103A, 104A are thereby detached 212 from the system, so that all traffic from all servers now uses database(s) 102B, 103B, 104B, which reflect the new update.

The method thus allows users to continue interacting with the website while an update is in process. All transactions (such as e-commerce orders) are properly handled without any data loss or downtime.

Figure 3A:
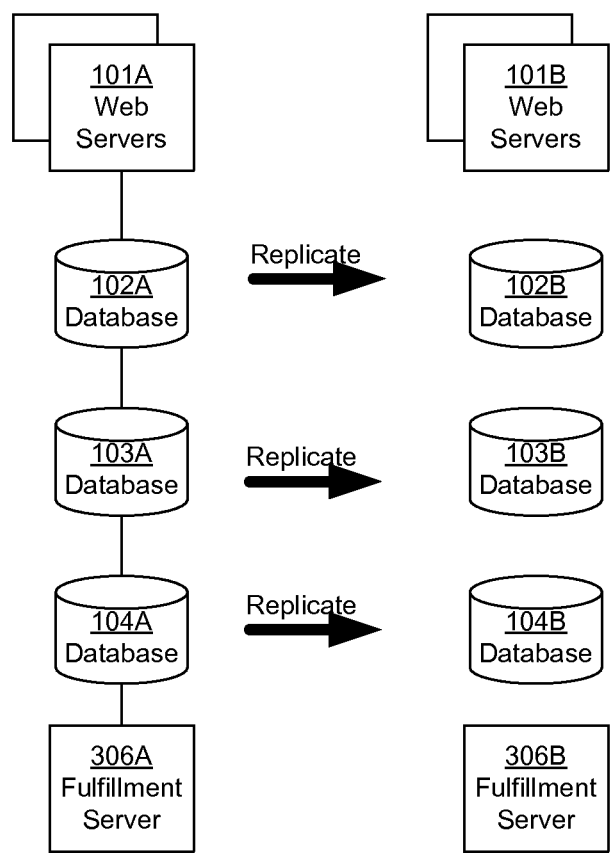
FIGS. 3A through 3E are block diagrams depicting a series of steps for updating a website database according to the data and code replication method.

Referring now to FIGS. 3A through 3E, there is shown a series of block diagrams depicting a series of steps for updating a website database according to the data replication method. FIG. 3A depicts the state of the system at step 204. Server farm 111 has been split 201 into servers 101A, 101B, and databases 102A, 103A, 104A are being replicated 204, or cloned into databases 102B, 103B, 104B. Fulfillment server 306A is shown connected to databases 102A, 103A, 104A indicating that it is the "live" system for fulfilling user requests such as orders. Fulfillment server 306B is disconnected because it is off-line.

Figure 3B:
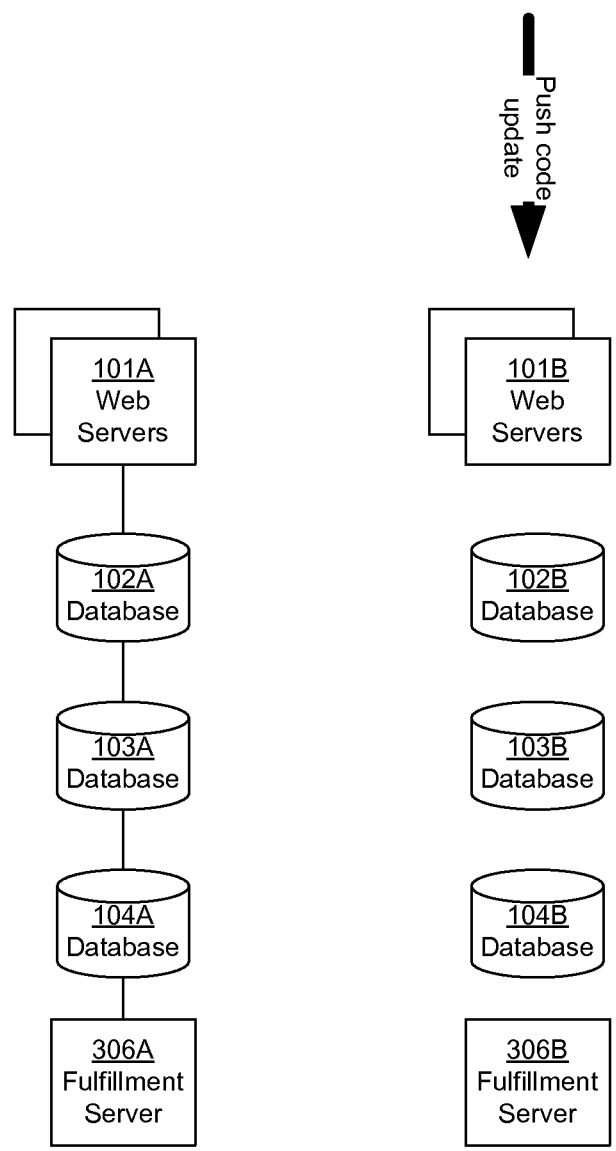

FIG. 3B depicts the state of the system at steps 206A, 206B, and 302. Servers 101A are live and accepting client transactions to be fulfilled by fulfillment server 306A. Servers 101B, databases 102B, 103B, 104B, and fulfillment server 206B are updated and tested.

Figure 3C:
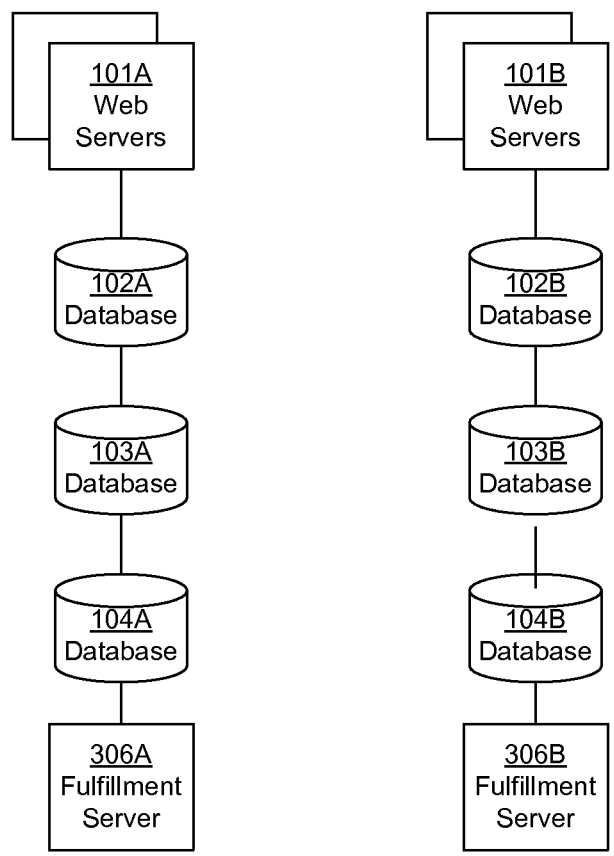

FIG. 3C depicts the state of the system at switchover step 209. Servers 101B, databases 102B, 103B, 104B, and fulfillment server 206B are brought live and begin accepting client transactions. Databases 102A, 103A, 104A, and fulfillment server 206A are drained of any orders in process. Thus, if a user is in the midst of submitting an order, the order is completed on databases 102A, 103A, 104A, and fulfillment server 206A before switchover is completed.

Figure 3D:
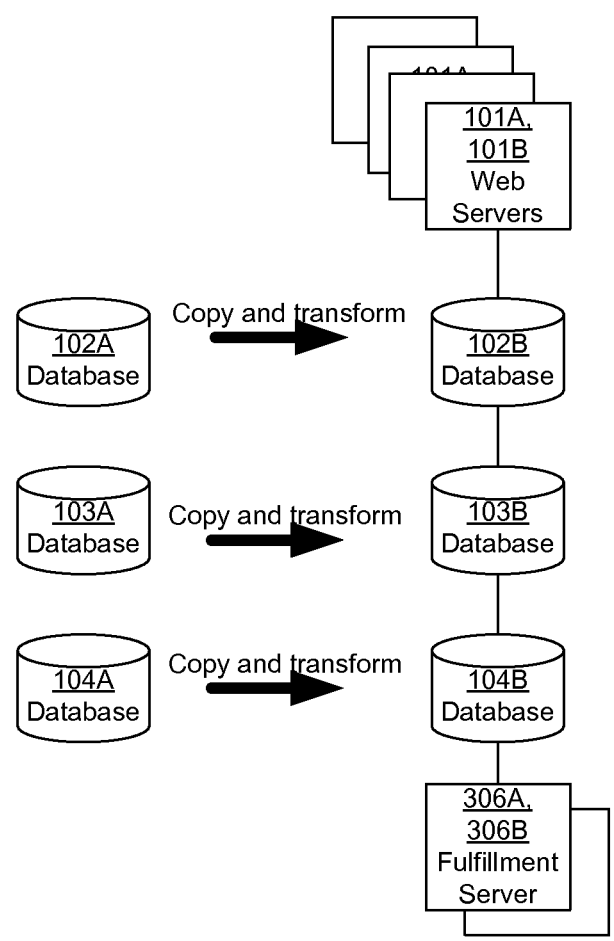

FIG. 3D depicts the state of the system at step 211. Data is copied from databases 102A, 103A, 104A to 102B, 103B, 104B including performing data transformations where appropriate. Servers 101A are updated and consolidated with servers 101B. Fulfillment servers 206A, 206B are also consolidated. All servers now direct traffic to databases 102B, 103B, 104B.

Figure 3E:
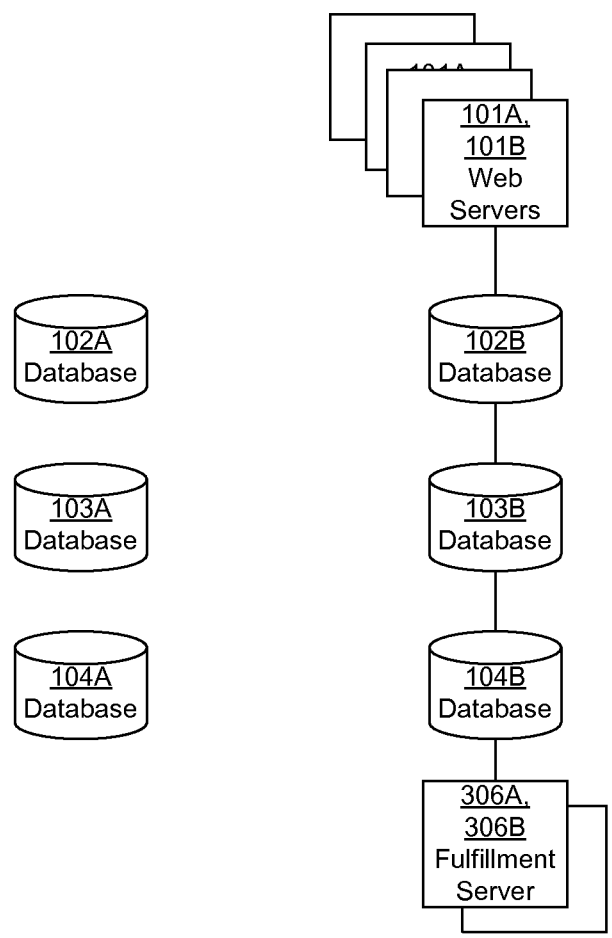

FIG. 3E depicts the state of the system at step 212. Old databases 102A, 103A, 104A are detached.

In one embodiment, the present invention is implemented using Oracle Real Application Clusters (RACs) which support deployment of a database across a cluster of servers. Two sets of databases are provided, as described above. Each set of databases has one or more standby databases that can take over in case of an unplanned outage. While a database is off-line for updating, its standby database is rebuilt so that it will be available when the database is brought "live".

Figure 4A:
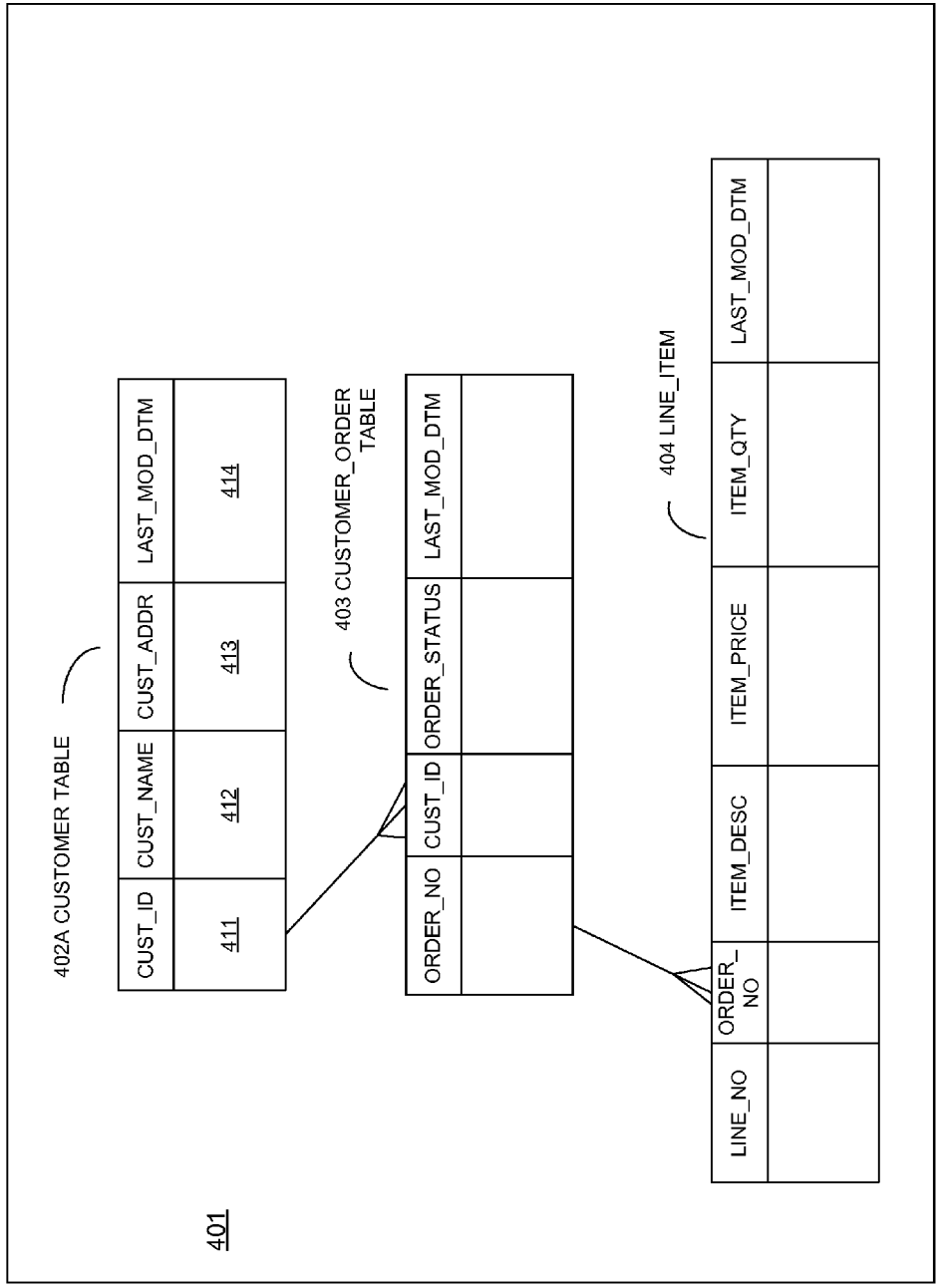
FIGS. 4A and 4B depict an example of a data model update that can be performed using the techniques of the present invention.
Figure 4B:
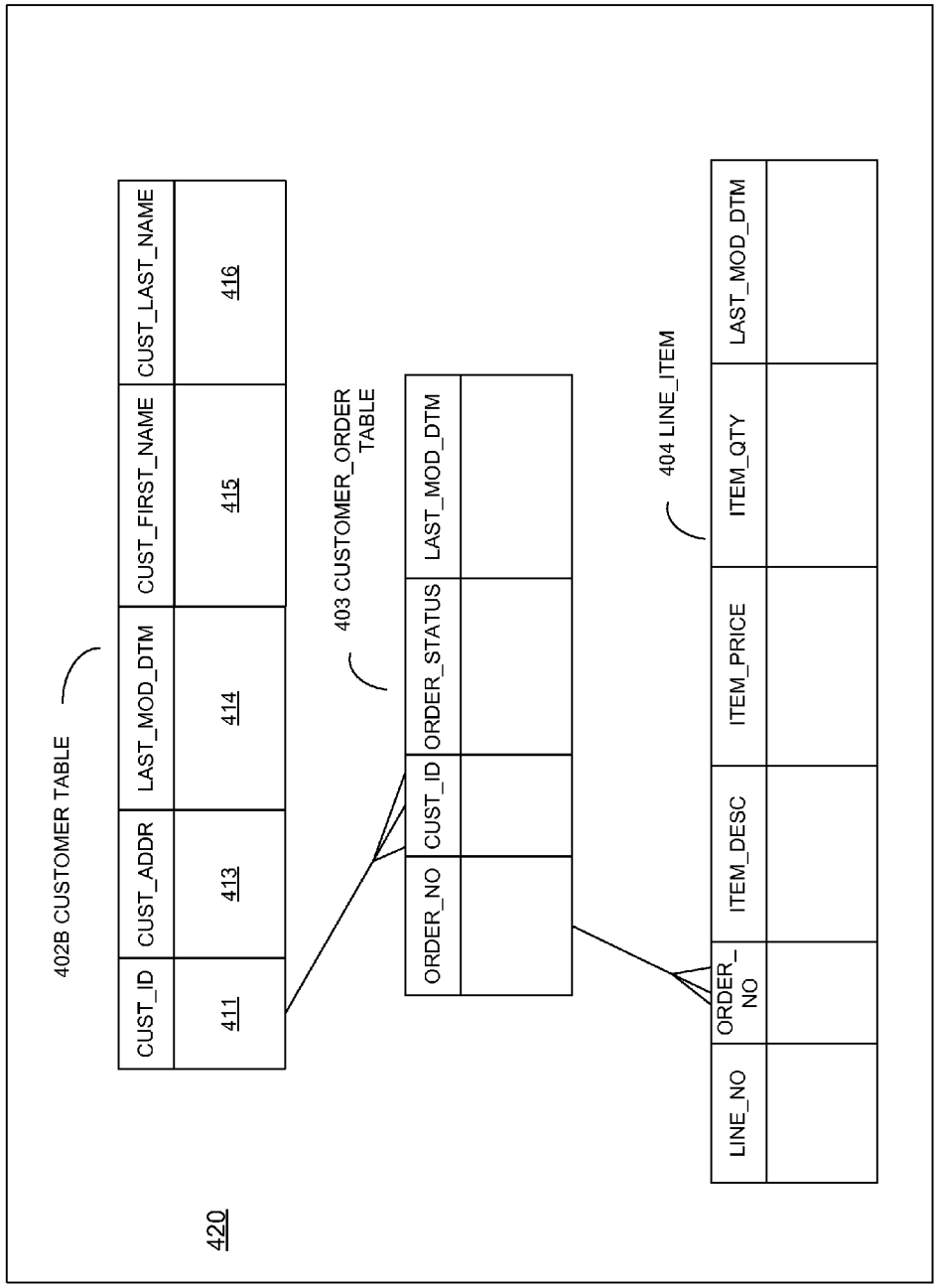

Referring now to FIGS. 4A and 4B, there is shown an example of a data model update that can be performed using the techniques of the present invention. Data model 401 represents an initial data model being used in a current release. Data model 401 includes three tables: customer table 402A, customer order table 403, and line item table 404. In the example, customer table 402A includes four fields: customer ID 411, customer name 412, customer address 413, and last modification date/time 414. Data model 420 represents a new data model being used in a new release. It includes the same three tables, but customer table 402B is being changed so that it now has separate fields for customer first name 415 and customer last name 416, instead of a single field for customer name 412.

Thus, in the example shown in FIG. 4, the data transformation that would be performed in steps 204 and 208 involve splitting customer name 412 into customer first name 415 and customer last name 416.

Synonyms

Figure 5:
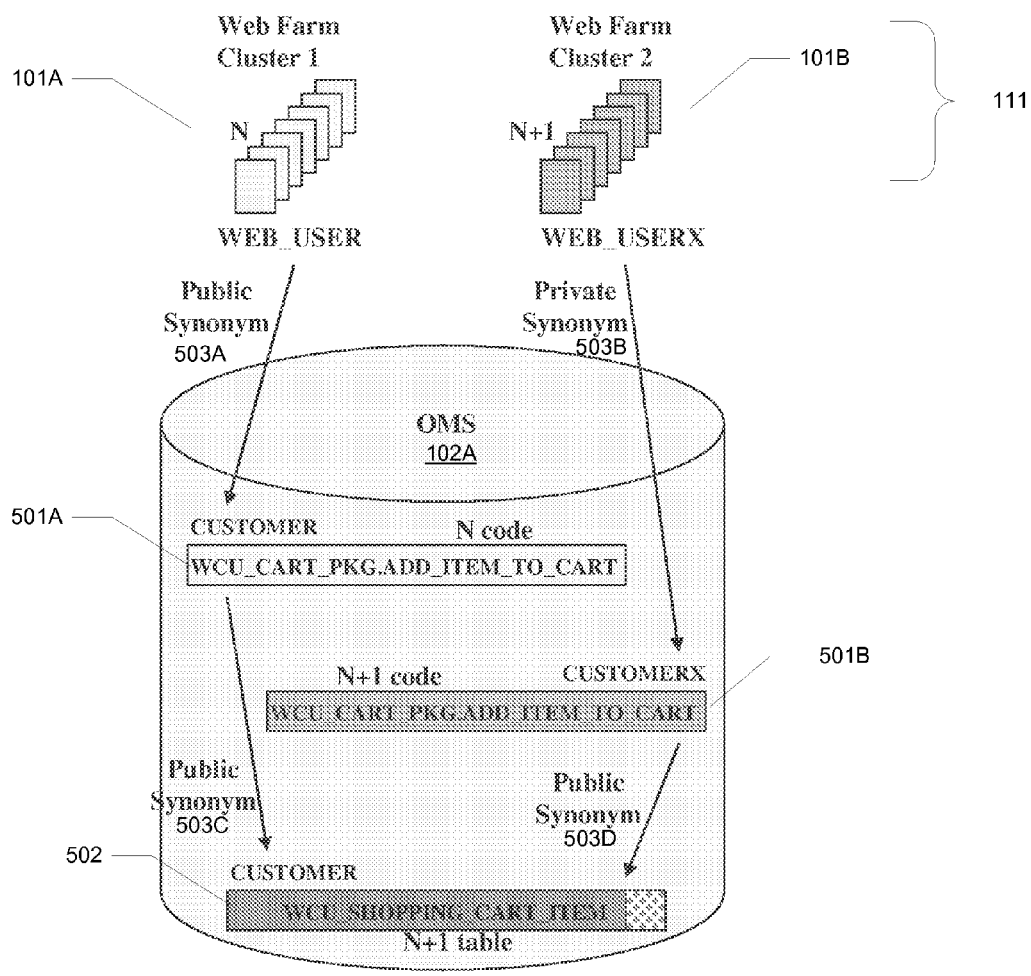
FIG. 5 is a block diagram depicting an example of a technique for updating a website database according to one embodiment, where synonyms are used to implement updates while avoiding the need to replicate data.
Figure 6:
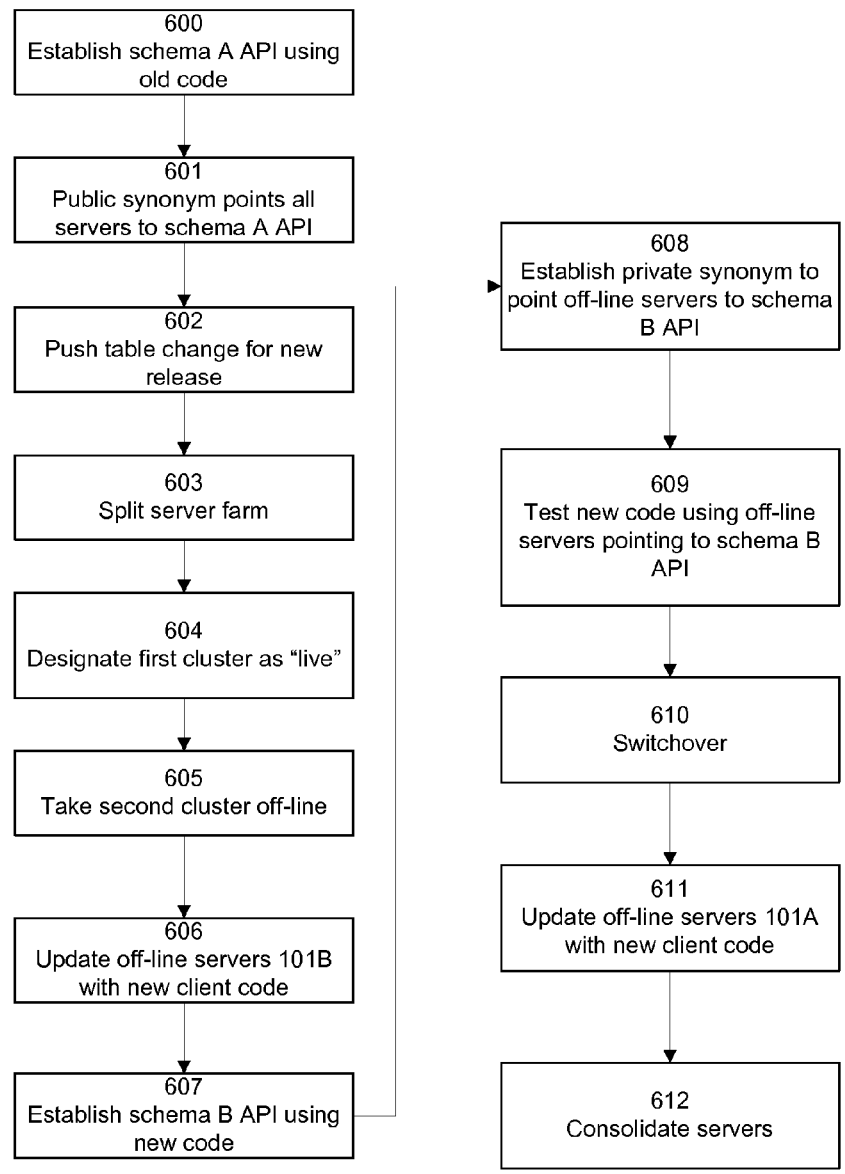
FIG. 6 is a flow diagram depicting an overall method for updating a website database according to the synonym method.

Referring now to FIG. 5, there is shown a block diagram depicting an example of a technique for updating a website database according to one embodiment, where synonyms are used to implement updates while avoiding the need to replicate data. Referring also to FIG. 6, there is shown a flow diagram depicting an overall method for updating a website database in this manner.

Database 102A is, for example, an order management system database whose data and/or code is/are being updated. Table 502 is an example of a customer table that is being updated according to the present invention. An API is established 600 for accessing table 502 using current (old) code; this API is referred to as "schema A". A public synonym 503A is established 601 which points all servers to the schema A API 501A when a request is made that involves access to table 502. Another public synonym 503C points schema A API 501A to table 502.

In the example, a change is being made to the structure of table 502. The change pushed 602 to table 502 during planned downtime. In one embodiment, this downtime is much shorter than would otherwise be required for website updates using prior art methods.

The server farm is split 603 into two clusters 101A, 101B. A first cluster 101A is designated 604 as "live", while a second cluster 101B is taken off-line 605 for testing purposes. In one embodiment, the present invention takes clusters off-line by causing a website traffic director such as a network load balancer (not shown) to direct all traffic to those clusters designated as "live".

In one embodiment, no separate table is created for the new code. In another embodiment, if any table structures are to be changed as part of the update (for example, if a data field is to be split into two new fields), data transformation code is developed to facilitate moving data into the new format. The data transformation code is usually release-specific software and appropriate to the type of table structure change that is being implemented.

Server updates are performed 606 on the off-line web servers 101B, for example by pushing new client code onto servers 101B.

An API is established 607 for accessing table 502 using new code; this API is referred to as "schema B". A private synonym 503B is established 608 which points off-line servers 101B to the schema B API 501B when a request is made that involves access to table 502. Private synonym 503B is not made available to the public, so that it can be used exclusively for testing purposes. A public synonym 503D points schema B API 501B to table 502. The new code is tested 609 using off-line servers 101B pointing to the schema B API 501B to access table 502.

Once the system has been tested, switchover 610 takes place: Cluster 101B is designated as "live" and cluster 101A is taken off-line. Private synonym 503B begins to point servers 101B to schema B API 501B.

If needed, server updates are performed 611 on the off-line web servers 101A. Schema A API 501A is updated as needed. Servers in cluster 101A are then consolidated 612 with those of cluster 101B so that the entire server farm is again available to receive web traffic. Since APIs 501A and 501B now contain the same updated code, one of them can be detached, so that all traffic from all servers now access table 102 using a single API.

The method thus allows updates to take place without the need for replicating data.

Figure 7A:
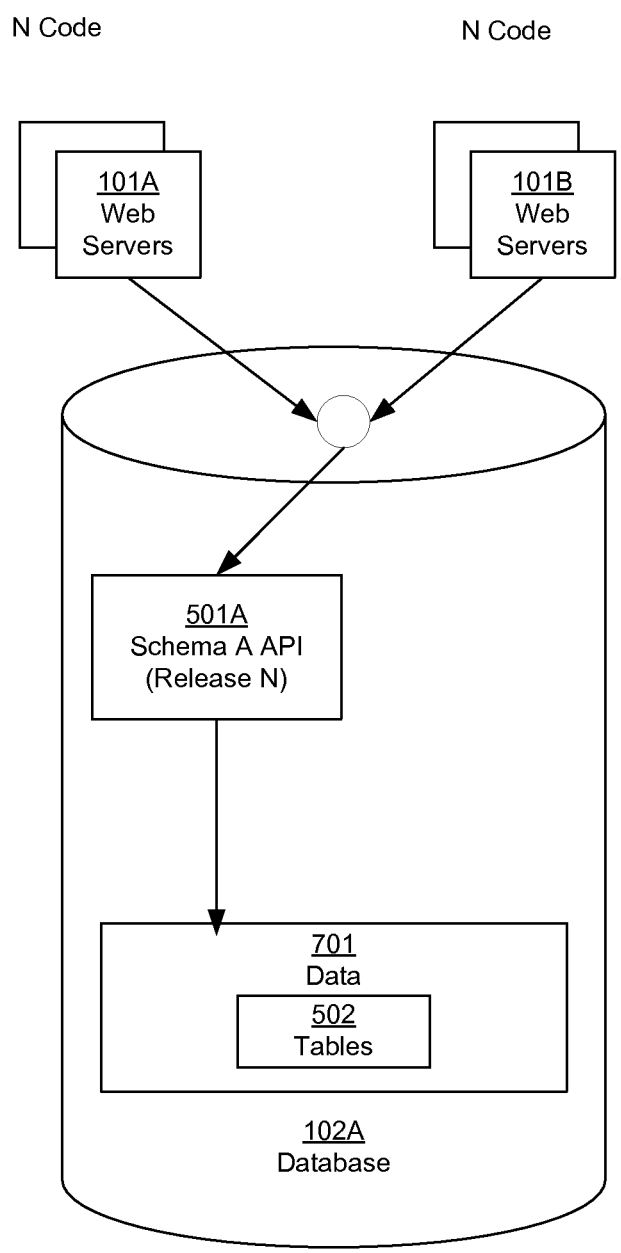
FIGS. 7A through 7E are block diagrams depicting a series of steps for updating a website database according to the synonym method.

Referring now to FIGS. 7A through 7E, there is shown a series of block diagrams depicting a series of steps for updating a website database according to the synonym method. FIG. 7A depicts the state of the system at step 603. Schema A API 501A, containing release N of the software (the "old code"), has been established 600, a public synonym has been established 601 to point all servers 101A, 101B to schema A API 501A, and a table change for the release N+1 ("new code") has been pushed 602 to data 701 including tables 502. The server farm has been split 603 into servers 101A, 101B, both using the same public synonym to access API 501A.

Figure 7B:
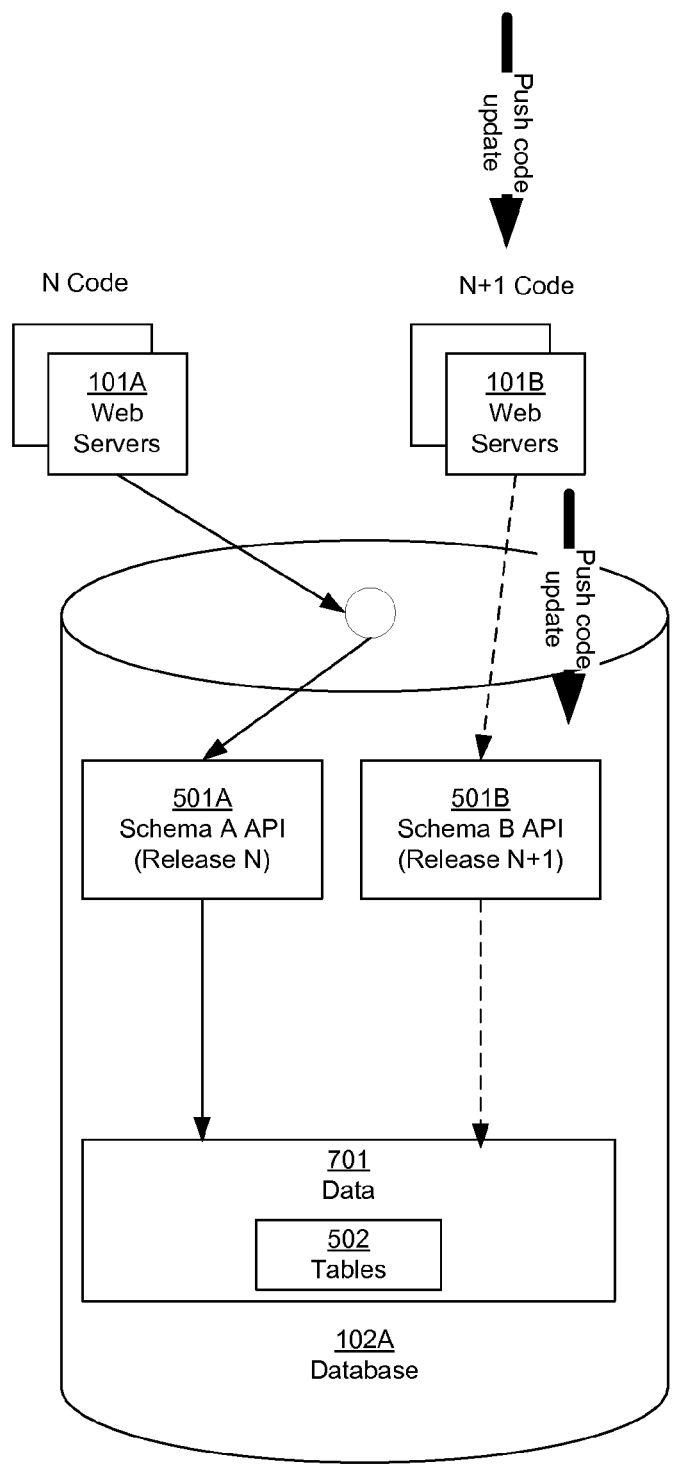

FIG. 7B depicts the state of the system at step 609. Servers 101A have been designated as live 604 and are accepting client transactions, with the public synonym pointing such transactions to schema A API 501A. Servers 101B are taken off-line 607. The new N+1 release of the code is pushed to web servers 101B and to schema B 501B. A private synonym is established 608 pointing web servers 101B to schema B API 501B. The new release N+1 is tested 609 using these off-line web servers 101B. Servers 101B, databases 102B, 103B, 104B, and fulfillment server 206B are updated and tested.

Figure 7C:
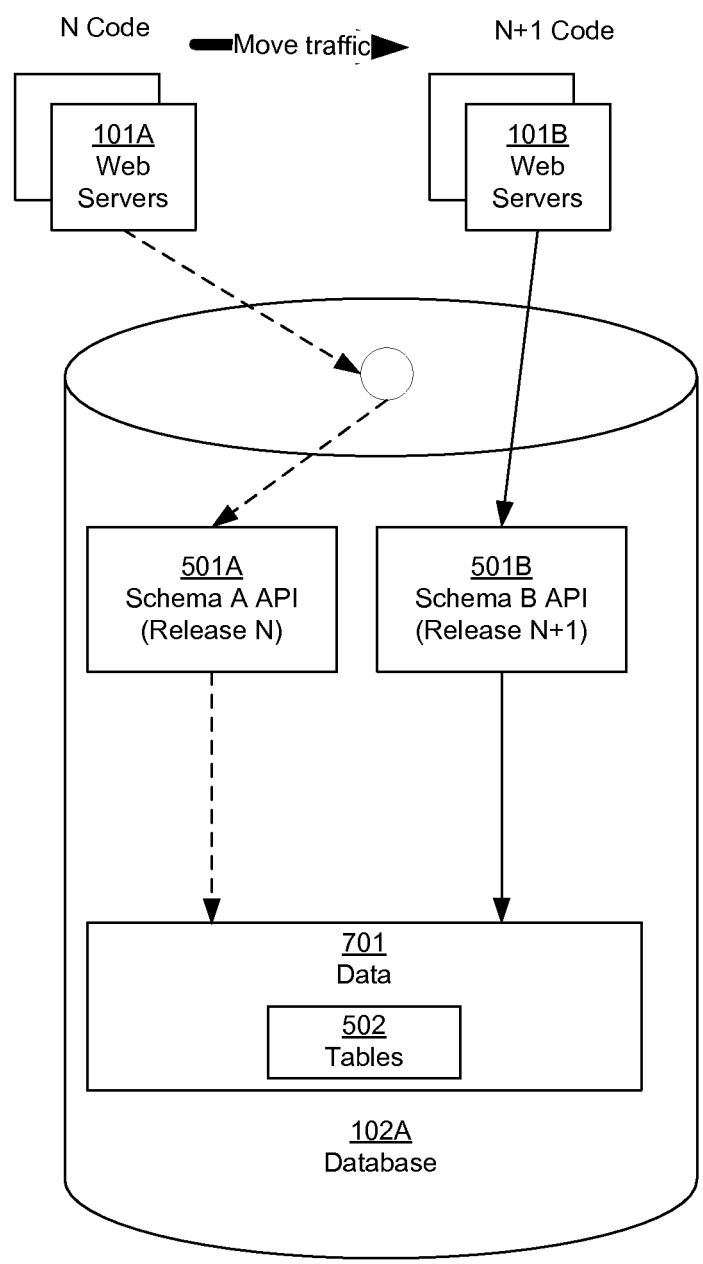

FIG. 7C depicts the state of the system at switchover step 610. Here, the new release N+1 has been tested and certified. Accordingly, servers 101B and schema B API 501B running release N+1 are brought live and begin accepting client transactions. Meanwhile, any transactions already in progress on servers 101A are completed using release N and schema A API 501A. Thus, if a user is in the midst of submitting an order, the order is completed using schema A API 501A before switchover 610 is completed.

Figure 7D:
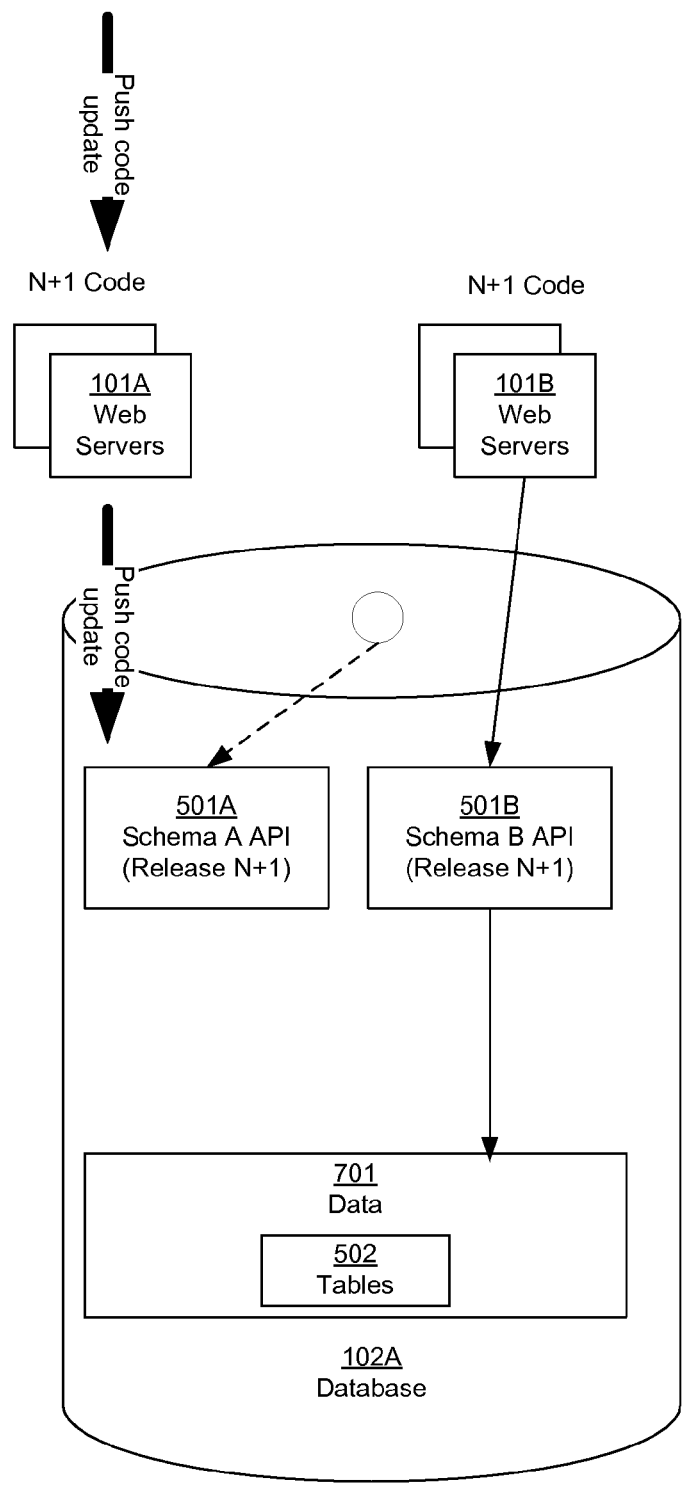

FIG. 7D depicts the state of the system at step 611. Once all transactions-in-progress have been services using schema A API 501A, updated code release N+1 ("new code") is pushed to web servers 101A, which are offline and not accepting traffic. Release N+1 is in turn pushed to schema A API 501A.

Meanwhile, live requests are directed by the private synonym to schema B API 501B, which is already running release N+1.

Figure 7E:
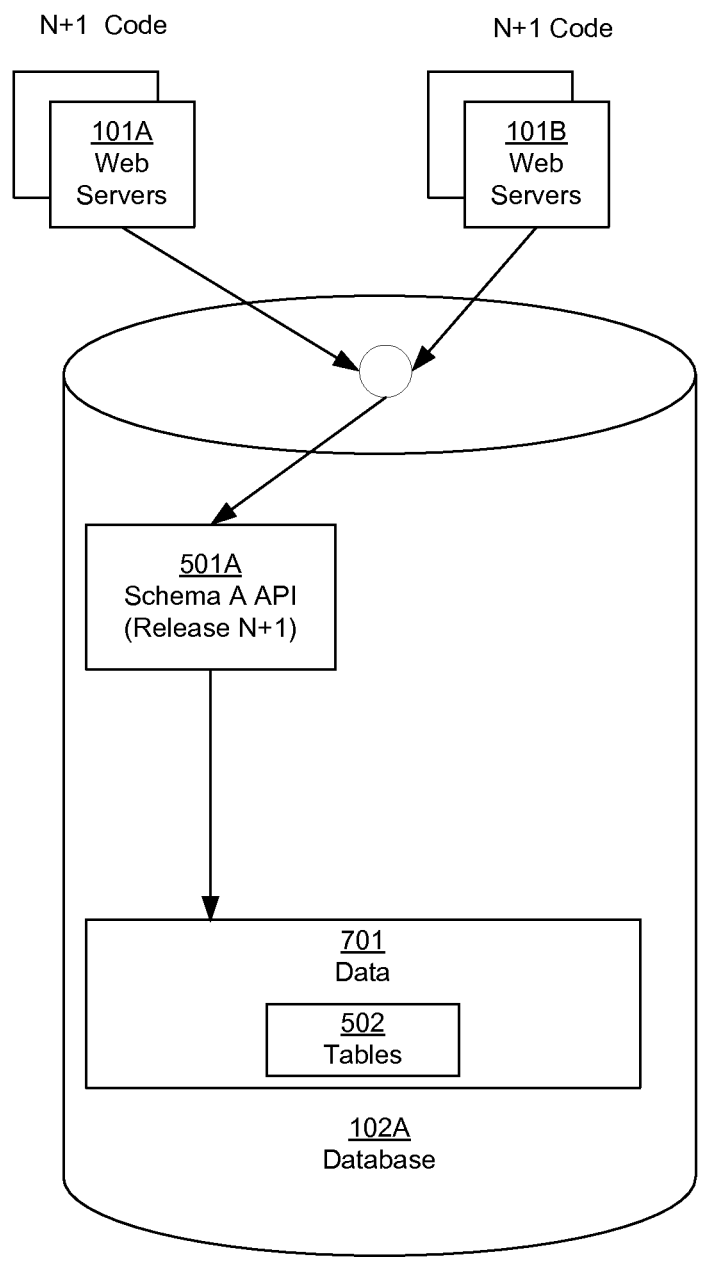

FIG. 7E depicts the state of the system at step 612. All servers 101A, 101B now run the N+1 code. Servers 101A, 101B are consolidated 6012 and rebalanced so that traffic is directed appropriately. The public synonym now directs all traffic to schema A API 501A which is running release N+1. Once all traffic has been switched to schema A API 501A, unused schema B API 501B is detached.

In one embodiment, the present invention is implemented using Oracle Real Application Clusters (RACs) which support deployment of a database across a cluster of servers. One database or set of databases is provided, as described above, (such as OMS, OMSFF, and EDI/BLM database) with schemas A and/or B providing access thereto. In one embodiment, the set of database or databases has one or more standby databases that can take over in case of an unplanned outage.

In one embodiment, the present invention is able to execute a data model update as described above in connection with FIGS. 4A and 4B.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a de-sired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method for implementing a web site update, the web site being available via a plurality of servers, the method comprising:

at a database, establishing a first application programming interface referencing a set of data stored at the database, wherein the set of data is in a first format, and wherein the first application programming interface uses a first code release to access the set of data in the first format;

at the database, configuring a first synonym to cause a processor to refer inbound transaction requests arriving at the database to the first application programming interface;

splitting the plurality of servers into a first subset of the plurality of servers and a second subset of the plurality of servers, including:
  designating the first subset of the plurality of servers as a live cluster;
  disabling public access to the second subset of the plurality of servers; and
  in a processor running at a website traffic director, redirecting website traffic to the live cluster;

privately updating the website through the second subset of the plurality of servers while the website traffic is redirected to the live cluster, including:
  updating software code on the second subset of the plurality of servers to a second code release;
  determining that a table structure of the set of data is to be changed to a new table structure as part of the web site update;
  accessing data transformation code developed for the website update, wherein the data transformation code includes one or more data transforms; and
  applying a data transform from the data transformation code to the set of data to move the set of data from the first format to a different second format to match the new table structure;

at the database, establishing a second application programming interface referencing the set of data stored at the database, wherein the second application programming interface uses the second code release;

at the database, configuring a second synonym to cause a processor to refer inbound transaction requests arriving at the database to the second application programming interface; and re-enabling public access to the second subset of the plurality of servers.

2. The method of claim 1, further comprising, subsequent to re-enabling public access to the second subset of the plurality of servers:
  disabling public access to the first subset of the plurality of servers;
  updating software code on the first subset of the plurality of servers to the second code release;
  re-enabling public access to the first subset of the plurality of servers; and
  in the processor running at the website traffic director, distributing the website traffic among the first subset of the plurality of servers and the second subset of the plurality of servers.

3. The method of claim 2, wherein the website traffic director comprises a network load balancer.

4. The method of claim 2, further comprising, prior to disabling public access to the first subset of the plurality of servers:
  completing at least one transaction already in progress at the first subset of the plurality of servers.

5. The method of claim 1, further comprising, subsequent to re-enabling public access to the second subset of the plurality of servers:
  disabling public access to the first subset of the plurality of servers;
  updating software code on the first subset of the plurality of servers to the second code release;
  re-enabling public access to the first subset of the plurality of servers; and
  consolidating the first subset of the plurality of servers and the second subset of the plurality of servers into a single set of a plurality of servers.

6. The method of claim 1, wherein the first synonym comprises a publicly available synonym, and wherein the second synonym comprises a private synonym.

7. The method of claim 6, further comprising:
  subsequent to configuring the second synonym to refer inbound transaction requests arriving at the database to the second application programming interface, testing the updated software code using the private synonym at a server of the plurality of servers.

8. The method of claim 1, wherein the database comprises at least one database table, and wherein the at least one database table comprises a table structure.

9. The method of claim 8, further comprising, prior to referring inbound transaction requests arriving at the database to the second application programming interface, changing at least one table structure at the database.

10. The method of claim 1, wherein updating software code on the second subset of the plurality of servers comprises replacing the first code release with the second code release.

11. The method of claim 1, wherein the website traffic is redirected to a plurality of servers that run the second code release.

12. A computer program product for implementing a website update, the website being available via a plurality of servers, the computer program product comprising:
  a non-transitory computer-readable storage medium; and
  computer program code, encoded on the non-transitory computer-readable storage medium, configured to cause at least one processor to perform the steps of:
    establishing a first application programming interface referencing a set of data stored at a database, wherein the set of data is in a first format, and wherein the first application programming interface uses a first code release to access the set of data in the first format;
    configuring a first synonym to cause a processor to refer inbound transaction requests arriving at the database to the first application programming interface;
    splitting the plurality of servers into a first subset of the plurality of servers and a second subset of the plurality of servers, including:
      designating the first subset of the plurality of servers as a live cluster;
      disabling public access to the second subset of the plurality of servers; and
      redirecting, by a website traffic director, website traffic to the live cluster;
    privately updating the web site through the second subset of the plurality of servers while the website traffic is redirected to the live cluster, including:
      updating software code on the second subset of the plurality of servers to a second code release;
      determining that a table structure of the set of data is to be changed to a new table structure as part of the web site update;
      accessing data transformation code developed for the website update, wherein the data transformation code includes one or more data transforms; and
      applying a data transform from the data transformation code to the set of data to move the set of data from the first format to a different second format to match the new table structure;

establishing a second application programming interface referencing the set of data stored at the database, wherein the second application programming interface uses the second code release;

configuring a second synonym to cause a processor to refer inbound transaction requests arriving at the database to the second application programming interface; and re-enabling public access to the second subset of the plurality of servers.

13. The computer program product of claim 12, further comprising computer program code configured to cause the at least one processor to perform the steps of, subsequent to enabling public access to the second subset of the plurality of servers:

disabling public access to the first subset of the plurality of servers;

updating software code on the first subset of the plurality of servers to the second code release;

re-enabling public access to the first subset of the plurality of servers; and distributing the website traffic among the first subset of the plurality of servers and the second subset of the plurality of servers.

14. The computer program product of claim 13, wherein the computer program code configured to cause the at least one processor to distribute the website traffic among the first subset of the plurality of servers and the second subset of the plurality of servers comprises computer program code configured to cause the at least one processor to configure a network load balancer to distribute the website traffic among the first subset of the plurality of servers and the second subset of the plurality of servers.

15. The computer program product of claim 13, further comprising computer program code configured to cause the at least one processor to, prior to disabling public access to the first subset of the plurality of servers:

complete at least one transaction already in progress at the first subset of the plurality of servers.

16. The computer program product of claim 12, further comprising computer program code configured to cause the at least one processor to perform the steps of, subsequent to enabling public access to the second subset of the plurality of servers:

disabling public access to the first subset of the plurality of servers;

updating software code on the first subset of the plurality of servers to the second code release;

re-enabling public access to the first subset of the plurality of servers; and consolidating the first subset of the plurality of servers and the second subset of the plurality of servers into a single set of a plurality of servers.

17. The computer program product of claim 12, wherein the computer program code configured to cause the at least one processor to update software code on the second subset of the plurality of servers comprises computer program code configured to cause the at least one processor to replace the first code release with the second code release.

18. A system for implementing a website update, the website being available via a plurality of servers, the system comprising:

a processor;

a first application programming interface installed at a database and referencing a set of data stored at the database, wherein the set of data is in a first format, and wherein the first application programming interface uses a first code release to access the set of data in the first format;

a website traffic director configured to:
configure a first synonym to cause a processor to refer inbound transaction requests arriving at the database to the first application programming interface; and
split the plurality of servers into a first subset of the plurality of servers and a second subset of the plurality of servers, including:
designate the first subset of the plurality of servers as a live cluster;
disable public access to the second subset of the plurality of servers; and
redirect website traffic to the live cluster;

a code release update module configured to privately update the web site through the second subset of the plurality of servers while the website traffic is redirected to the live cluster, including:
update software code on the second subset of the plurality of servers to a second code release;
determine that a table structure of the set of data is to be changed to a new table structure as part of the web site update;
access data transformation code developed for the website update, wherein the data transformation code includes one or more data transforms; and
apply a data transform from the data transformation code to the set of data to move the set of data from the first format to a different second format to match the new table structure; and a second application programming interface installed at the database and referencing the set of data stored at the database, wherein the second application programming interface uses the second code release;

wherein, subsequent to the software code update, the website traffic director configures a second synonym to cause a processor to refer inbound transaction requests arriving at the database to the second application programming interface and re-enables public access to the second subset of the plurality of servers.

19. The system of claim 18, wherein, subsequent to enabling public access to the second subset of the plurality of servers:

the website traffic director disables public access to the first subset of the plurality of servers;

the code release update module updates software code on the first subset of the plurality of servers to the second code release; and the website traffic director re-enables public access to the first subset of the plurality of servers and distributes the website traffic among the first subset of the plurality of servers and the second subset of the plurality of servers.

20. The system of claim 19, wherein the website traffic director comprises a network load balancer.

21. The system of claim 19, wherein the website traffic director consolidates the first subset of the plurality of servers and the second subset of the plurality of servers into a single set of a plurality of servers.

22. The system of claim 19, further comprising, prior to the website traffic director disabling public access to the first subset of the plurality of servers, the first subset of the plurality of servers completes at least one transaction already in progress.

23. The system of claim 18, wherein the code release update module updates software code on the second subset of the plurality of servers by replacing the first code release with the second code release.

* * * * *